Jan. 15, 1924.

E. V. ELCONIN 1,480,933

AXLE

Filed Aug. 2, 1922

Inventor

E. V. Elconin by B. M. Kent

Attorney

Patented Jan. 15, 1924.

1,480,933

UNITED STATES PATENT OFFICE.

ELI V. ELCONIN, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO.

AXLE.

Application filed August 2, 1922. Serial No. 579,110.

*To all whom it may concern:*

Be it known that I, ELI V. ELCONIN, a citizen of the United States, and a resident of Cleveland, county of Cuyahoga, State of Ohio, have invented certain new and useful Improvements in Axles, of which the following is a specification.

This invention relates to driving axles for motor vehicles and more particularly to means for adjusting the pinion gear mounting.

One of the objects of the invention is to provide a comparatively simple and conveniently operable adjusting means for the pinion shaft and its mounting, and also a means whereby the parts may be readily and permanently secured in any adjusted position.

Figure 2:
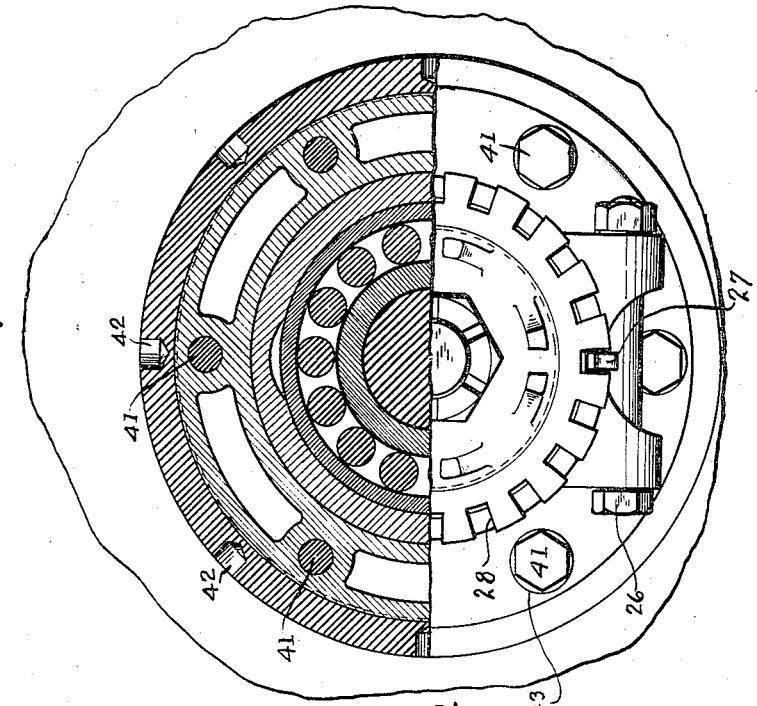
Figure 1:
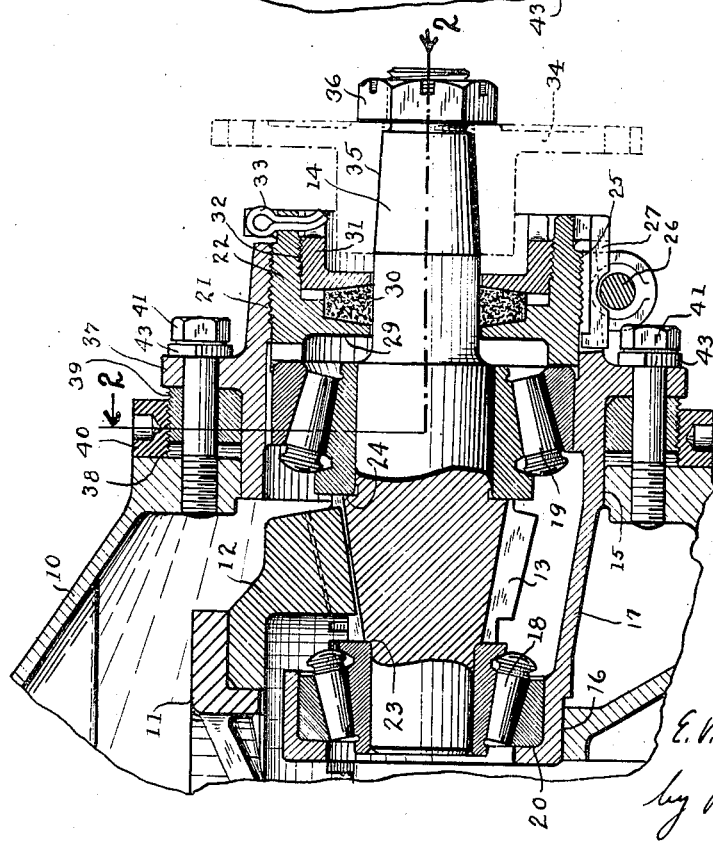

Other objects and the features of novelty will be apparent from the following description taken in connection with the accompanying drawings, of which:

Fig. 1 is a longitudinal section through the forward end of an axle embodying my invention; and Fig. 2 is a composite view partly in end elevation and partly in section on the line 2—2 of Fig. 2.

Referring to the drawings, 10 indicates the usual forward extension of the axle housing which may be of any preferred construction in which the part 10 is bolted or otherwise secured to the main housing section and carries the differential mechanism of the axle, or the part 10 may be integral with the main housing, both forms of construction being well-known and the invention being in no wise limited to either. A part of the differential case is indicated at 11 and carries the usual ring gear 12 which meshes with the pinion 13 on the shaft 14, the pinion 13 being shown as integral with the shaft but in some instances it may be preferred to make it as a separate element from the shaft, both types of construction being well-known in the art. The housing 10 has the two aligned bores 15 and 16 in which the cage 17 for the shaft 14, is mounted.

Bearings 18 and 19 support the shaft 14 in the cage 17, the bearing 18 abutting a shoulder 20 at the inner end of the cage. The outer end of the cage is internally threaded to receive the ring 22 which bears against the outer side of the bearing 19 and holds this bearing in position. The bearing 18 engages a shoulder 23 on the shaft 14 and the bearing 19 engages a shoulder 24, the pinion 13 being between these shoulders and the shoulders transmitting end thrust in the shaft 14 to the bearings. The outer end of the cage 17 is split at the point 25 and the ring 22 is secured by a clamping bolt 26 and a key 27 arranged in the split 25 and extending into one of the series of notches 28 in the outer end of the ring 22.

The ring 22 has a wall 29 which closely surrounds the shaft 14 and serves to retain lubricant in the bearing 19, leakage of lubricant between the shaft and the wall 29 being prevented by the usual felt packing 30 which is held in position by the gland 31 having a threaded connection 32 with the ring 22 and being secured by a cotter pin 33. A flange for a universal joint is indicated in broken lines at 34 and is secured on the tapered outer end 35 of the shaft by the nut 36, in the usual manner.

The cage 17 is provided with a radially projecting flange or shoulder 37 and between the inner side of this flange and the end 38 of the housing 10 there are two rings 39 and 40 which are threaded together, the ring 39 engaging the flange 37 and the ring 40 engaging the end 38 of the housing. Bolts 41 extend through the flange 37 and the ring 39 into the end wall of the housing and permanently secure the cage 17 in position.

From the foregoing description it will be observed that the pinion shaft 14 and its bearings form, with the cage, a unit which may be adjusted axially of the shaft 14 to adjust the relation of the pinion 13 to the gear 12. In order to be able to make this adjustment conveniently I have provided rings 39 and 40 and it will be noted that the ring 40 has openings 42 in its periphery to receive a spanner or other tool for rotating the ring. When it is desired to make an adjustment the bolts 41 are loosened and the ring 40 rotated the required amount after which the bolts 41 are tightened, thereby securing the ring 40 and the cage 17 in position. The bolts 41 may be secured against loosening by the usual lock washers 43.

It will be noted that the ring 39 is held against rotation by the bolts 41 and hence the adjustment of the ring 40 is a simple matter. Moreover, the threaded connection between the rings 39 and 40 permits of a very fine adjustment and the ring 40 being on the exterior of the axle makes the adjustment very convenient.

Having thus described my invention, what I claim is:

1. In axle construction, the combination of a housing having an opening for a pinion shaft, a cage for carrying said shaft and its bearings and having a shoulder arranged exteriorly of said housing, and a pair of members threaded together and cooperating with said shoulder and said housing for the purpose of adjustably locating said cage axially.

2. In axle construction, the combination of a housing having an opening for a pinion shaft, a cage for carrying said shaft and its bearings and having a shoulder arranged exteriorly of said housing, a pair of members threaded together and cooperating with said shoulder and said housing for the purpose of adjustably locating said cage axially, and bolts cooperating with said cage and said housing and passing through one of said members to secure the parts together.

3. In axle construction, the combination of a housing having an opening for a pinion shaft, a cage for carrying said shaft and its bearings and having a flange thereon exteriorly of said housing, a pair of members threaded together and arranged with one in engagement with said flange and the other in engagement with said housing whereby said cage may be adustably located axially, and bolts cooperating with said flange and said housing to secure the parts in position.

4. In axle construction, the combination of a housing having an opening for a pinion shaft, a cage for carrying said shaft and its bearings and having a flange thereon exteriorly of said housing, a pair of members threaded together and arranged with one in engagement with said flange and the other in engagement with said housing whereby said cage may be adjustably located axially, and bolts cooperating with said flange and said housing and extending through one of said pair of members to secure the parts in position.

5. In axle construction, the combination of a housing having an opening for a pinion shaft, a cage for carrying said shaft and its bearings and having a flange thereon exteriorly of said housing, a pair of members threaded together and arranged with one in engagement with said flange and the other in engagement with said housing whereby said cage may be adjustably located axially, and bolts cooperating with said flange and said housing and extending through the one of said members having engagement with said flange.

In testimony whereof I affix my signature.

ELI V. ELCONIN.